(12) United States Patent
Ikeuchi

(10) Patent No.: US 10,478,369 B2
(45) Date of Patent: Nov. 19, 2019

(54) MOTION ASSIST DEVICE

(71) Applicant: HONDA MOTOR CO., LTD., Tokyo (JP)

(72) Inventor: Yasushi Ikeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 197 days.

(21) Appl. No.: 15/718,503

(22) Filed: Sep. 28, 2017

(65) Prior Publication Data

US 2018/0116895 A1     May 3, 2018

(30) Foreign Application Priority Data

Nov. 2, 2016   (JP) ................. 2016-214772

(51) Int. Cl.
    *B25J 9/00*     (2006.01)
    *A63B 21/00*     (2006.01)
    *A61H 1/02*     (2006.01)
    *G05B 15/02*     (2006.01)

(52) U.S. Cl.
    CPC ........... *A61H 1/0255* (2013.01); *A61H 1/024* (2013.01); *A61H 1/0244* (2013.01);
    (Continued)

(58) Field of Classification Search
    CPC .... A61H 1/024; A61H 1/0255; A61H 1/0244; A61H 3/00; A61H 2201/1223; A61H 2201/5069; A61H 2201/5064; A61H 2201/1261; A61H 2201/1642; A61H 2201/165; A61H 2201/1671; A61H 2201/50; A61H 2201/5038; A61H 2205/108; G05B 15/02; A63B 21/00181; A63B 2220/836; A63B 2220/803;
    (Continued)

(56) References Cited

U.S. PATENT DOCUMENTS 3,449,769 A * 6/1969 Mizen ................ A61F 2/54
                                            623/26
5,020,790 A * 6/1991 Beard ................ A61F 5/0102
                                            482/4

(Continued)

FOREIGN PATENT DOCUMENTS

JP     2013173190 A     9/2013
JP     2015173739 A     10/2015
(Continued)

OTHER PUBLICATIONS

Notice of Reasons for Refusal for JP Application No. 2016-214772, dated Jul. 2, 2019, 4 pages.

*Primary Examiner* — Stephen Holwerda
(74) *Attorney, Agent, or Firm* — Armstrong Teasdale LLP

(57) ABSTRACT

A motion assist device, comprises a brace (2, 3, 5, 6, 11; 23, 24, 32, 35) configured to be worn by a user, an assist motor (4, 34) provided in association with the brace to assist a prescribed motion of the user, a control unit (10; 40) for controlling an operation of the assist motor, and an attitude detection sensor (8, 18; 38) connected to the control unit for detecting an attitude of the user. The control unit is configured to activate the assist motor when a prescribed attitude of the user is detected by the attitude detection sensor so that loads on parts of the user's body other than the part which is directly assisted can be minimized.

7 Claims, 15 Drawing Sheets

(52) U.S. Cl.
CPC ....... *A63B 21/00181* (2013.01); *B25J 9/0006* (2013.01); *G05B 15/02* (2013.01); *A61H 2201/5064* (2013.01); *A61H 2201/5069* (2013.01); *A63B 2220/44* (2013.01); *A63B 2220/56* (2013.01); *A63B 2220/80* (2013.01); *A63B 2220/803* (2013.01); *A63B 2220/836* (2013.01)

(58) Field of Classification Search
CPC ............ A63B 2220/80; A63B 2220/56; A63B 2220/44; B25J 9/0006
See application file for complete search history.

(56) References Cited

U.S. PATENT DOCUMENTS

| | | | | |
|---|---|---|---|---|
| 5,101,472 | A | * | 3/1992 | Repperger ............... B25J 9/163 700/261 |
| 5,282,460 | A | * | 2/1994 | Boldt ........................ A61F 2/68 403/119 |
| 2008/0161937 | A1 | * | 7/2008 | Sankai ................... A61H 3/008 623/25 |
| 2010/0121232 | A1 | * | 5/2010 | Sankai ................... A61H 3/008 601/23 |
| 2011/0266323 | A1 | * | 11/2011 | Kazerooni ............ B25J 9/0006 224/575 |
| 2012/0226203 | A1 | * | 9/2012 | Nakashima ............... A61H 3/00 601/34 |
| 2014/0012164 | A1 | * | 1/2014 | Tanaka ................... B25J 9/0006 601/35 |
| 2014/0142475 | A1 | * | 5/2014 | Goldfarb .................. A61H 3/00 601/35 |
| 2016/0331624 | A1 | * | 11/2016 | Sankai ................... A61H 1/024 |

FOREIGN PATENT DOCUMENTS

| | | |
|---|---|---|
| JP | 2015208795 A | 11/2015 |
| JP | 2016168121 A | 9/2016 |
| WO | WO-2015115490 A1 * | 8/2015 |

* cited by examiner

MOTION ASSIST DEVICE

TECHNICAL FIELD

The present invention relates to a motion assist device for assisting a prescribed motion of a user.

BACKGROUND ART

In a known knee joint motion assist device, an upper frame is secured to an upper leg of a user, and a lower frame is secured to a corresponding lower leg of the user. A rotatable support unit fitted with a drive unit positioned on the outer side of the knee of the user pivotally connects the upper frame and the lower frame to each other. A control unit detects a motion of the user via an acceleration sensor for detecting a motion of the user, and the drive unit provides a drive force to the rotatable support unit upon detection of a prescribed motion of the user so that the motion of the user may be assisted by the rotatable support unit. See JP2015-173739A.

According to the conventional knee joint motion assist device, depending on the attitude of the user in initiating a certain motion such as lifting an object from a floor surface, an undue load may be applied to other parts of the body such as the hip joint so that the user cannot fully receive the benefit of the knee joint motion assist device. Also, if the attitude of the user when initiating a certain motion is not proper, the load on the drive unit may be increased so that the power consumption increases, resulting in a shorter battery life.

SUMMARY OF THE INVENTION

In view of such problems of the prior art, a primary object of the present invention is to provide a motion assist device that can minimize loads on parts of the user's body other than the part which is directly assisted.

A second object of the present invention is to provide a motion assist device that can minimize power consumption in assisting a prescribed motion of a user.

To achieve such objects, the present invention provides a motion assist device, comprising: a brace (2, 3, 5, 6, 11; 23, 24, 32, 35) configured to be worn by a user; a drive unit (4, 34) provided in association with the brace to assist a prescribed motion of the user; a control unit (10; 40) for controlling an operation of the drive unit; and an attitude detection sensor (8, 18; 38) connected to the control unit for detecting an attitude of the user; wherein the control unit is configured to activate the drive unit when a prescribed attitude of the user is detected by the attitude detection sensor.

Thereby, the control unit can activate the drive unit when the user has taken an optimum attitude for the operation of the motion assist device.

Preferably, the control unit is configured to assist a motion of a joint of the user when the attitude detection sensor has detected an attitude of the user that requires a comparatively large force for a part of the user's body other than the joint or requires a comparatively small force for assisting the motion of the joint. The attitude as used herein may mean not only a prescribed instantaneous attitude of the user but also a certain range of attitude which the user takes over a time period.

Thereby, the user can obtain an assist force from the motion assist device in such a way as to maximize the comfort of the user. Alternatively or additionally, the power consumption of the drive unit can be minimized. Furthermore, the user is encouraged by the motion assist device to learn the optimum attitude in performing the prescribed motion.

According to a preferred embodiment of the present invention, the brace includes an upper member secured to a body part located above a knee joint and a lower member secured to a body part located below the knee joint, the control unit being configured to assist an extending motion of the knee joint when the attitude detection sensor has detected that an elbow of the user has come into contact with an upper surface of a knee or upper leg part of the user.

Thereby, the user is enabled to perform the prescribed motion such as lifting an object from a floor in such a way as to minimize the effort required by other parts of the user's body such as a hip joint.

According to a particularly preferred embodiment of the present invention, the drive unit is configured to assist an extending motion of the knee joint when the attitude detection sensor has detected that the elbows of the user have both come into contact with the upper surfaces of the respective knees or upper leg parts of the user.

Thereby, the prescribed attitude of the user can be detected in a reliable manner.

Preferably, the attitude detection sensor is configured to detect a pressure or a force acting between the elbow and the upper surface of the knee or the upper leg part.

Thus, the attitude detection sensor may consist of a relatively inexpensive pressure sensor, a contact switch or a proximity switch.

According to another preferred embodiment of the present invention, the brace includes an upper member secured to a body part located above a hip joint and a lower member secured to a body part located below the hip joint, the control unit being configured to assist an extending motion of the hip joint when the attitude detection sensor has detected that a bend angle of a knee joint of the user is smaller than a prescribed value, and a bend angle of the hip joint is greater than a prescribed angle.

Thereby, the user is enabled to perform the prescribed motion such as lifting an object from a floor in such a way as to minimize the effort required by other parts of the user's body such as a knee joint.

Preferably, the drive unit is configured to assist an extending motion of the hip joint when the attitude detection sensor has detected that the bend angles of the knee joints of the user are both smaller than a prescribed value, and the bend angles of the hip joints are both greater than a prescribed angle.

Thereby, the prescribed attitude of the user can be detected in a reliable manner.

Preferably, the attitude detection sensor is configured to detect an absolute angle of an upper leg or an angle of the upper leg relative to a lower leg.

Thus, the attitude detection sensor may consist of a relatively inexpensive sensor such as an angle sensor, a gyro sensor and an electronic level sensor.

BRIEF DESCRIPTION OF THE DRAWING(S)

DESCRIPTION OF THE PREFERRED EMBODIMENT(S)

Preferred embodiments of the present invention are described in the following with reference to the appended drawings.

First Embodiment

Figure 1:
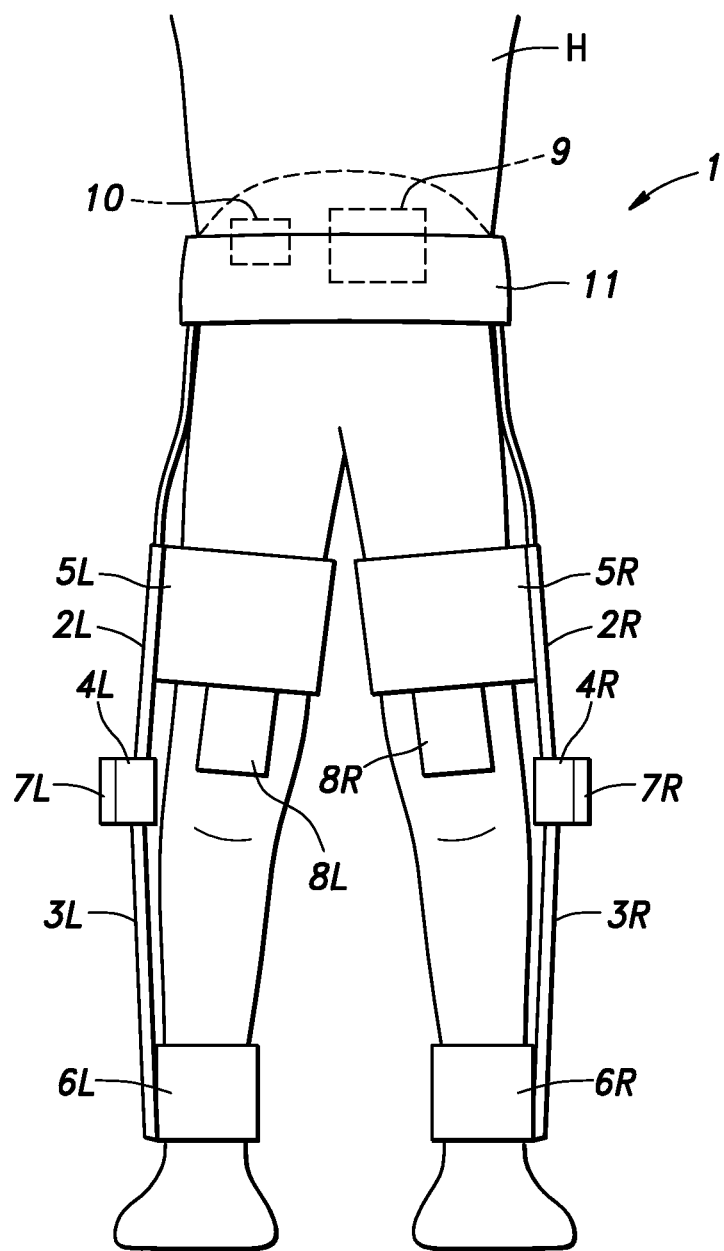
FIG. 1 is a front view of a user wearing a knee joint motion assist device according a first embodiment of the present invention.

Firstly, referring to FIGS. 1 to 8, a knee joint motion assist device 1 according to a first embodiment of the present invention is described in the following. FIG. 1 is a front view of a knee joint motion assist device 1 which is being worn by a user H. The knee joint motion assist device 1 is substantially symmetrical with respect to the sagittal plane of the user H, and includes a small number of elements provided only on one of the right and left sides. Hereinafter, the elements provided symmetrically to the left and right are denoted by same reference numerals with a suffix "L" indicating the left or a suffix "R" indicating the right, and only the components on one side of the user are described in the following wherever appropriate without accompanying the numerals denoting such parts with the suffix.

The knee joint motion assist device 1 includes an upper leg arm 2 (femoral part) extending along an outer side of at least a lower part of an upper leg of the user, and a lower leg arm 3 (tibial part) extending along an outer side of at least an upper part of a lower leg of the user, and connected to a lower end of the upper leg arm 2 at an upper end via a pivot shaft extending in the lateral direction. The joint between the upper leg arm 2 and the lower leg arm 3 is provided with an assist motor 4 for producing an assist torque T that selectively urges the lower leg arm 3 in the (forward) direction to extend relative to the upper leg arm 2, and the lower leg arm 3 in the (rearward) direction to bend relative to the upper leg arm 2. In particular, the assist motor 4 applies the assist torque T to the lower leg arm 3, and the reaction thereof is supported by the upper leg arm 2.

An upper part of the upper leg arm 2 is provided with a band 5 for retaining the upper leg of the user H to the upper leg arm 2 by being wrapped around the upper leg of the user H. A lower part of the lower leg arm 3 is provided with a band 6 for retaining the lower leg of the user H to the lower leg arm 3 by being wrapped around the lower leg of the user H. Thus, the assist torque applied by the assist motor 4 can be applied to the upper and lower legs of the user H without causing discomfort. The upper leg arm 2, the lower leg arm 3 and the bands 5 and 6 may be collectively referred to as an assist force transmission member.

The assist motor 4 is provided with an angle sensor 7 for detecting an angle θ between the upper leg arm 2 and the lower leg arm 3 or the angle between the upper leg and the lower leg of the user H. The band 5 for the upper leg arm 2 is provided with a pressure sensor 8 which measures the pressure acting on the surface of the upper leg or the knee of the user H.

The user H wears a belt 11 around the waist, and a control unit 10 for controlling the assist motors 4 for the right and left legs and a battery 9 are supported by the belt 11. The battery 9 supplies electric current to the control unit 10, the assist motors 4 and the angle sensors 7. The control unit 10 controls the output torques of the assist motors 4 according to the output signals of the pressure sensor 8 and the angle sensor 7. Thus, the knee joint motion assist device 1 is enabled to assist the flexing movement of the lower leg relative to the upper leg about the knee joint or the knee joint motion of the user H. In particular, the knee joint motion assist device 1 of the illustrated embodiment is configured to assist the flexing motion of the knee joint when the user H lifts an object O placed on a lower surface such as an upper surface of a shelf or a floor surface.

Figure 2:
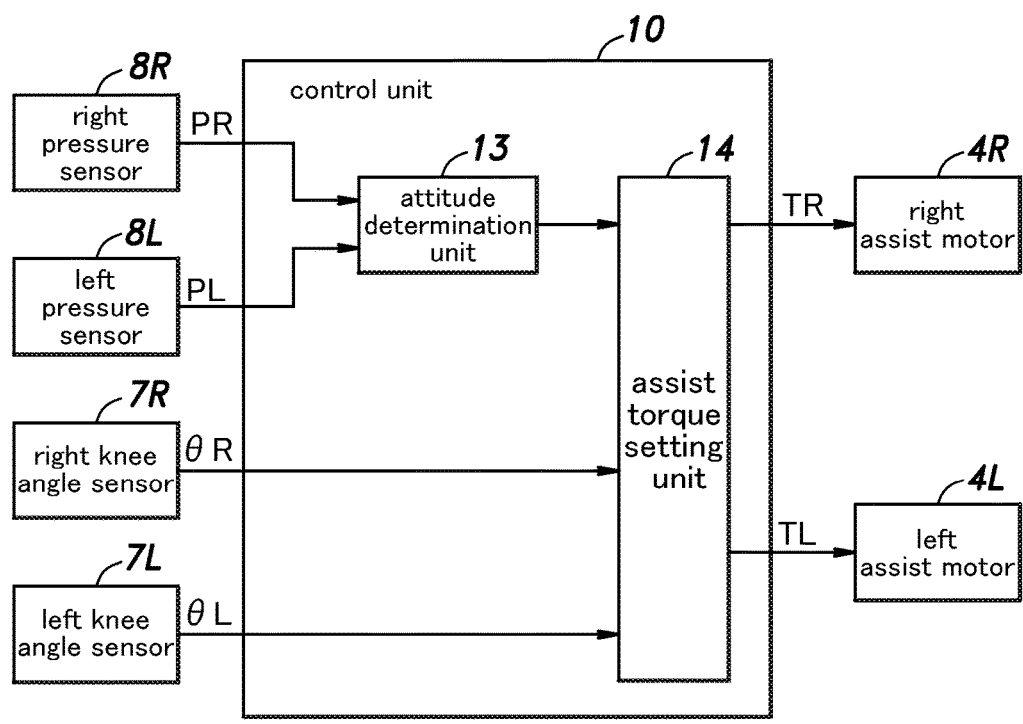
FIG. 2 is a functional block diagram of a control unit of the knee joint motion assist device.

FIG. 2 is a functional block diagram of the control unit 10 shown in FIG. 1. As shown in FIG. 2, the control unit 10 includes an attitude determination unit 13 for determining the attitude of the user H from the pressure P acting on the upper surface of the upper leg or the knee of the user. The attitude determination unit 13 determines that the both of the elbows of the user H are placed on the respective knees or upper legs in the illustrate embodiment. Alternatively, the attitude determination unit 13 may also be configured to determine that at least one of the elbows of the user H is placed on the respective knees or upper legs.

The determination result of the attitude determination unit 13 is used by an assist torque setting unit 14. The assist torque setting unit 14 determines the assist torques TR and TL of the assist motors 4 according to the bend angles θR and θL of the right and left knees detected by the respective angle sensors 7R and 7L. The computed assist torques TR and TL are converted into the corresponding values of electric current, and motor drivers (not shown in the drawings) supply the corresponding electric currents to the respective assist motors 4 from the battery 9 so that the required assist torques are produced from the assist motors 4. More specifically, when the two elbows of the user H are placed on the respective knees or upper legs, the assist torques are produced from the two assist motors 4. In other words, the control unit 10 starts an assisting operation for the motions of the two knee joints upon detecting that the elbows of the user H are placed on the respective knees or upper legs.

Figure 3A:
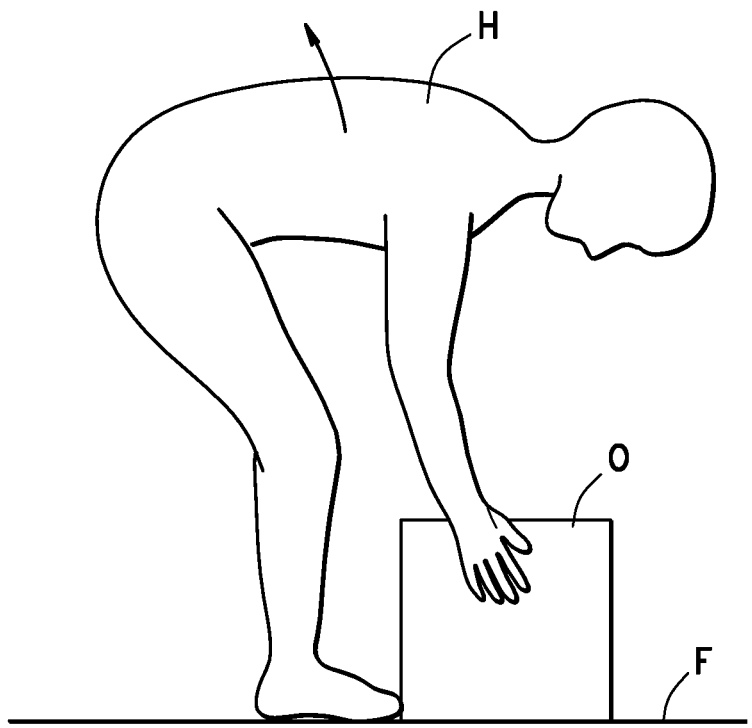
FIG. 3a is a simplified side view of the user wearing the knee joint motion assist device and stooping over an object to be lifted.
Figure 3B:
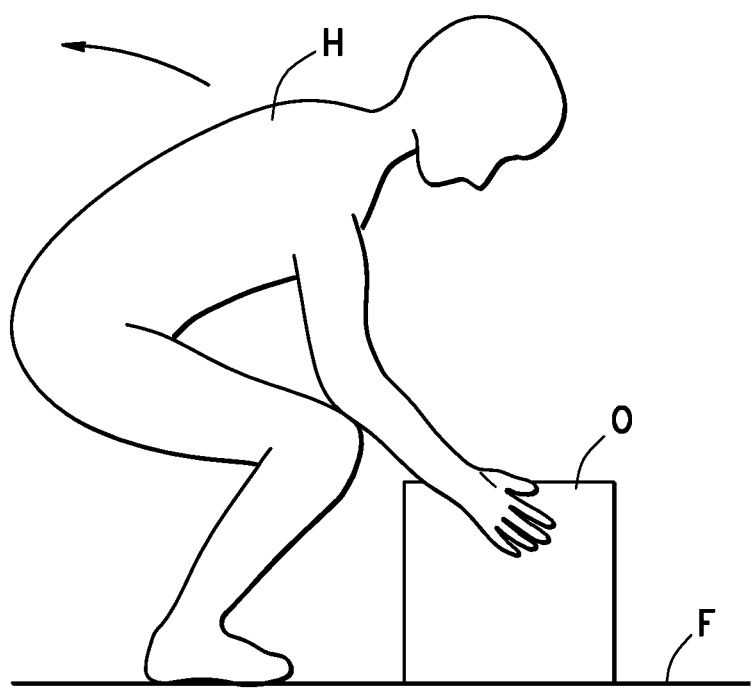
FIG. 3b is a view similar to FIG. 3a where the user is squatting ready to lift the object from a floor surface.

FIG. 3a is a simplified side view illustrating the attitude of the user H about to lift an object U with the knees straightened, and FIG. 3b is a similar view when the knees are bent and the elbows placed on the respective knees. When the user is about to lift the object O from the floor surface F, initially, the torso of the user is bent over the object to be lifted (by flexing the torso relative to the upper leg about the hip joint) while the knees are kept straight as shown in FIG. 3a. But this attitude is not suitable for the user to lift the object directly as it strains various parts of the body of the user.

Therefore, the user then bends the knees as shown in FIG. 3b until the elbow of the user touches the upper surfaces of the respective knees. Thereafter, the user is enabled to lift the object by straightening the hip joint and the knee joint without causing any undue strain to various parts of the body of the user.

Figure 4:
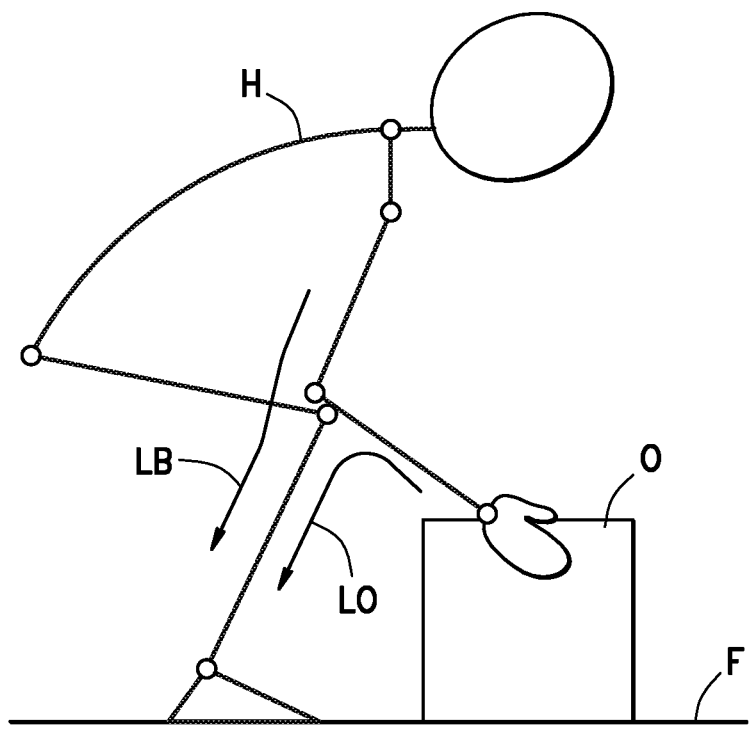
FIG. 4 is a diagram illustrating how forces involved in lifting the object are transmitted.
Figure 5:
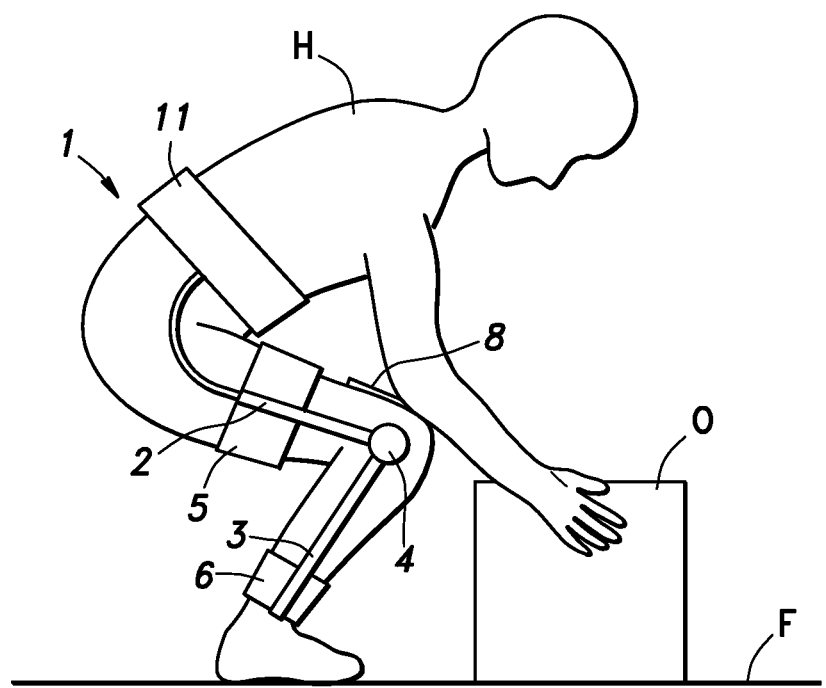
FIG. 5 is a simplified side view of the user wearing the knee joint motion assist device and is squatting ready to lift the object from a floor surface.

FIG. 4 is a diagram for explaining how the load L in lifting the object O is transmitted to the various parts of the body of the user. When the user squats with the hip joints and the knee joints are bent so that the elbows are placed on the upper surfaces of the respective knees, the load can be partly supported by the lower legs via the lower arms and the elbows of the user. The user in this condition can slightly lift the object O without significantly loading the hip joints or the knee joints of the user.

According to the illustrated embodiment, the assist torque setting unit 14 starts the assistance of the knee motions of the two knees using the detection of placing the elbows of the user on the respective knees as a trigger since this attitude is suited for supporting the load of the object O without causing any undue strain to the various parts of the body of the user.

The attitude at which the loads on the hip joints and the knee joints can be kept low in lifting an object from the floor is not limited to that shown in FIG. 3b. The elbows may contact the parts of the upper legs somewhat behind the knees without causing any undue strain to the hip joints and the knee joints so as not to cause any undue strain to the hip joints and the knee joints in lifting the object from the floor.

As shown in FIG. 3, the pressure sensor 8 extends from the band 5 of the upper leg to the upper surface of the knee or has a prescribed length along the length of the upper leg. Therefore, the pressure sensor 8 can detect the pressure of the elbow not only on the knee but also on a more rearward part of the upper leg.

Thus, the knee joint motion assist device 1 starts the assisting operation of the knee joints of the user when the pressure sensors 8 have both detected a pressure from the elbows or when the user has taken an attitude suitable for lifting the object from the floor surface F. When the user repeatedly uses the knee joint motion assist device 1, the user becomes accustomed to this attitude when lifting an object, and eventually becomes trained or encouraged to take this attitude when lifting an object from the floor surface.

Figure 6:
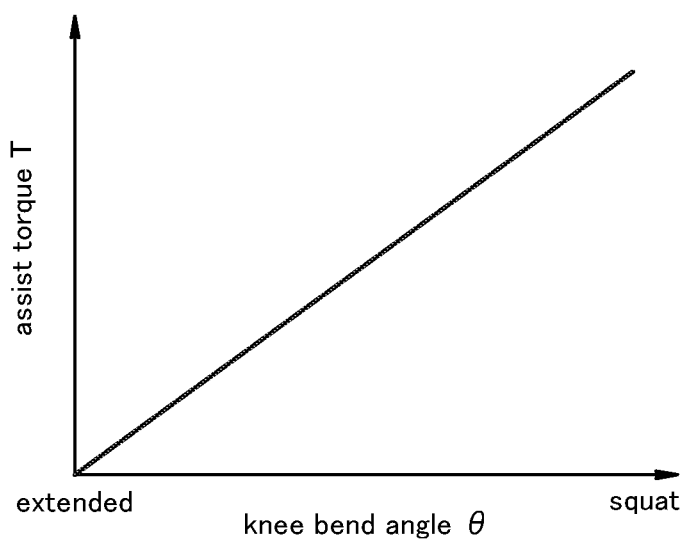
FIG. 6 is a graph showing the relationship between an assist torque and a flex angle of the knee joint.

FIG. 6 is a graph showing the relationship between the bend angle θ of the knee joint and the assist torque T set by the assist torque setting unit 14. A small bend angle θ of the knee joint means that the user H is in the upright attitude, and a large bend angle θ of the knee joint means that the user H is sitting or squatting or in the process of assuming such an attitude. The assist torque setting unit 14 sets the assist torque T to 0 when the bend angle θ of the knee joint corresponds to the standing attitude of the user H, and increases the assist torque T in proportion to the increase in the bend angle θ of the knee.

By configuring the assist torque setting unit 14 to provide an assist torque T in this manner, the knee joint motion assist device 1 provides a relatively large assist torque T to the user H in an initial stage of the lifting motion for the object O, and reduces the assist torque T as the lifting motion progresses. When the object O is fully lifted, and the bend angle θ of the knee joint substantially equal to zero, the assist torque T becomes equal to zero. Thereby, the knee joint motion assist device 1 can assist the user H to lift the object O in a comfortable and smooth manner.

Figure 7:
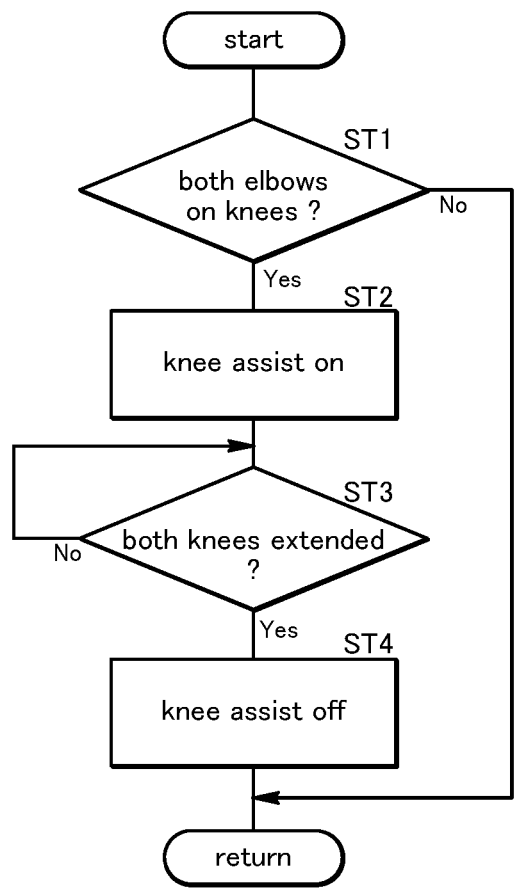
FIG. 7 is a flowchart showing the mode of operation of the control unit of the first embodiment.

FIG. 7 is a flowchart of the assist control performed by the control unit 10 shown in FIG. 2. When the power supply is turned on, the control unit 10 starts the assist control for generating the assist torque T in the left and right assist motors 4. During the execution of a main flow (not shown in the drawings), the control unit 10 periodically determines if the both elbows of the user H rest upon the respective knees (step ST1). The determination result of step ST1 is Yes when pressures P detected by the right and left pressure sensors 8R and 8L are both greater than a prescribed value, and is otherwise No.

When the determination result of step ST1 is No, the program flow returns to the main flow. When the determination result of step ST1 is Yes, the control unit 10 starts a knee assist operation (step ST2). In the knee assist operation, the control unit 10 sets the assist torque T to 0 when the knee bend angle θ corresponds to the standing attitude of the user H, and set the assist torque T to a value proportional to the knee bend angle θ via the left and right assist motors 4 as shown in FIG. 6. As a result, the user H is assisted by the knee joint motion assist device 1 in lifting the object O in a favorable manner.

Thereafter, the control unit 10 determines if the knees are both extended (step ST3). The determination result of step ST3 is Yes when the bend angles θ of the left and right knee joints detected by the left and right angle sensors 7 are both equal to or less than a prescribed value (0 degrees, for example), and is otherwise No. When the determination result of step ST3 is Yes, the control unit 10 turns off the knee assist operation (step ST4), and returns to the main flow. When the determination result of step ST3 is No, the control unit 10 continues the knee assist operation of step ST2.

The motion assist device of the illustrated embodiment thus comprises, on each side of the user, a brace including the upper leg arm 2 secured to the corresponding upper leg of the user H via the band 5, the lower leg arm 3 having an upper end pivotally connected to a lower end of the upper leg arm 2, and secured to the corresponding lower leg of the user H via the band 6, a drive unit consisting of the assist motor 7 connected between the upper leg arm 2 and the lower leg arm 3 for effecting an angular motion between them, the pressure sensor 8 affixed to the upper surface of the knee or the upper leg of the user H for detecting the attitude of the user H, and the control unit 10 for commanding the assist motor 7 to produce an assist torque when the pressure sensor 8 has detected that the elbow of the user is applying a pressure to the upper surface of the knee or the upper leg part of the user H. Thus, the knee joint motion assist device 1 of the illustrated embodiment does not activate the assist motor 7 when an undue strain would be placed on the hip joint and/or the knee joint of the user (such as when the user H is standing). Therefore, the user is prevented from lifting an object O from the floor surface F when the user's attitude is likely to cause strain on the hip joint and/or the knee joint of the user.

The attitude of the user that triggers the operation of the knee joint motion assist device 1 is determined as an attitude in which the user experiences relatively small strain on the hip joint and/or the knee joint of the user, and this attitude can be detected as a pressure applied to the upper surface of the knee or the upper leg part of the user by the elbow of the user. Therefore, the user is taught in such a manner that a prescribed motion such as lifting an object from the floor surface is performed by assuming an appropriate attitude.

The upper leg arm 2 and the lower leg arm 3 transmit the assist torque T assisting the knee joint to the upper leg and the lower leg when the user H lifts the object O, and the pressure sensor 8 detects the attitude in which the elbow is in contact with the upper surface of the knee or the upper leg part of the user H. Therefore, when the user H initiates a motion to lift the object O, the assist torque T is transmitted to the lower leg when the attitude of the user is such that the strain on the hip joint is minimal. It should be noted that the assist torque T may also be transmitted to the upper leg and the ground. Even in such a case, it is possible to assist the motion of the user according to the present invention.

The pressure sensor 8 detects the pressure P applied to the upper surface of the knee or the upper leg part by the elbow of the user H. Therefore, it can be easily detected that the user H has taken an attitude in which the load on the hip joint is light.

Figure 8:
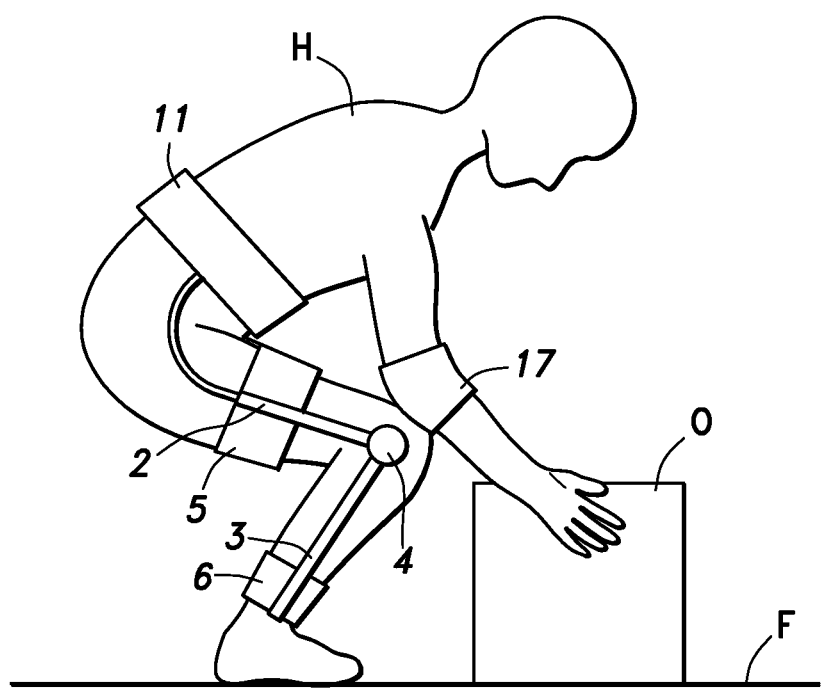
FIG. 8 is a view similar to FIG. 5 showing a modification of the first embodiment.

Referring to FIG. 8, a knee joint motion assist device 1 according to a modified embodiment of the present invention is described in the following. FIG. 8 is a side view showing the knee joint motion assist device 1 of the modified embodiment worn by the user who has squatted and placed the elbows on the knee. In regard to the modified embodiment, the parts corresponding to the previous embodiment are denoted with like numerals without necessarily describing such parts to avoid redundancy.

In this embodiment, the knee joint motion assist device 1 is provided with a pressure sensor 8 which is attached to the elbow via an elbow band 17, instead of the knee or the lower leg. In this case also, the pressure sensor 18 detects a pressure applied to the knee or the lower leg by the elbow. More precisely, the control unit 10 detects that the user H is in the attitude suitable for lifting an object when the pressure sensors 18 on the respective elbows of the user have both detected a pressure applied to the knees or the lower leg parts by the respective elbows. Thus, the knee joint motion assist device 1 can start assisting the motion of the left and right knee joints by using the detection result of the pressure sensors 8 as a trigger for assisting the knee joints of the user.

Instead of pressure sensors, a contact switch 18 (a pressure switch or a proximity switch) configured to be activated by a pressure applied thereto may be provided on the knee band 5 or the elbow band 17. The switch 18 thus functions as a sensor for detecting the attitude of the user H. In this case also, the control unit 10 detects that the user H is in the attitude suitable for lifting an object when the switches 18 on the respective elbows or the respective knees of the user have both detected a pressure applied to the knees or the lower legs by the respective elbows.

Second Embodiment

A hip joint motion assist device 21 according to a second embodiment of the present invention is described in the following with reference to FIGS. 9 to 11.

Figure 9:
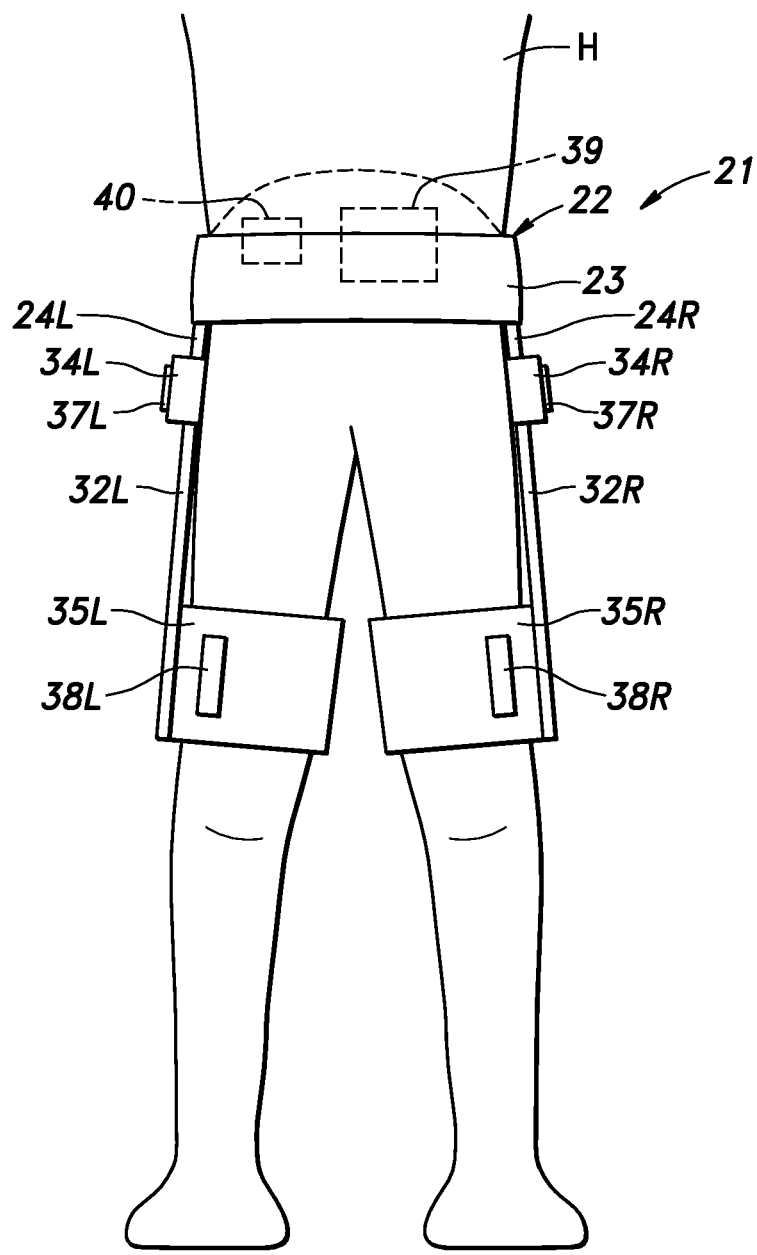
FIG. 9 is a view similar to FIG. 1 showing a user wearing a hip joint motion assist device according a second embodiment of the present invention.

FIG. 9 is a front view of a hip joint motion assist device 21 which is being worn by a user H. The hip joint motion assist device 21 is substantially symmetrical with respect to the sagittal plane of the user H, and includes a small number of elements provided only on one of the right and left sides. Hereinafter, the elements provided symmetrically to the left and right are denoted by same reference numerals with a suffix "L" indicating the left or a suffix "R" indicating the right, and only the components on one side of the user are described in the following wherever appropriate without accompanying the numerals denoting such parts with the suffix.

The hip joint motion assist device 21 includes a pelvic support member 22 configured to be worn on a pelvic part of the user in a similar manner as an ordinary belt. The pelvic support member 22 includes a relatively stiff back part extending along the back side of the user H, and a flexible belt part 23 connected between the two lateral ends of the back part and extending along the front side of the user H, typically in a detachable manner (although not shown in the drawings). The pelvic support member 22 further includes a pair of side frame members 24 connected to the respective lateral ends of the back part, and extends downward to parts corresponding to the hip joints of the user H.

The lower end of each side frame member 24 is connected to an upper end of an upper leg arm 32 via a pivot shaft extending in the lateral direction. The joint between the side frame member 24 and the upper leg arm 32 is provided with an assist motor 34 for producing an assist torque T that selectively urges the upper leg arm 32 in the (rearward) direction to extend relative to the side frame member 24, and the upper leg arm 32 in the (forward) direction to bend relative to the side frame member 24. In particular, the assist motor 34 applies the assist torque T to the upper leg arm 32, and the reaction thereof is supported by the side frame member 24.

A lower part of the upper leg arm 32 is provided with a band 35 for supporting the upper leg of the user H to the upper leg arm 32 by being wrapped around the upper leg of the user H. Thus, the assist torque supplied by the assist motor 34 can be applied to the lower leg of the user H without causing discomfort. The side frame member 24, the upper leg arm 32 and the band 35 may be collectively referred to as an assist force transmission member.

The assist motor 34 is provided with an angle sensor 37 for detecting an angle θ between the side frame member 24 and the upper leg arm 32 or the angle between the pelvic part and the lower leg of the user H. The band 35 for the upper leg arm 32 is provided with an angle sensor 38 for detecting an angle of the upper leg relatively to a vertical line (plumb line). The angle sensor 38 may consist of a gyro sensor or an acceleration sensor that can detect the angle of the upper leg of the user relatively to the direction of the gravitational force.

A control unit 40 for controlling the assist motors 34 for the right and left legs and a battery 39 are supported by the back part of the pelvic support member 22. The battery 39 supplies electric current to the control unit 40, the assist motors 34 and the hip joint angle sensors 37 and the upper leg angle sensor 38. The control unit 40 controls the output torques of the assist motors 34 according to the output signals of the these angle sensors 37 and 38. Thus, the hip joint motion assist device 21 is enabled to assist the flexing movement of the upper leg relative to the pelvis about the hip joint of the user H under a prescribed control process as will be described hereinafter. In particular, the hip joint motion assist device 21 of the illustrated embodiment is configured to assist the flexing motion of the hip joint when the user H lifts an object O.

Figure 10:
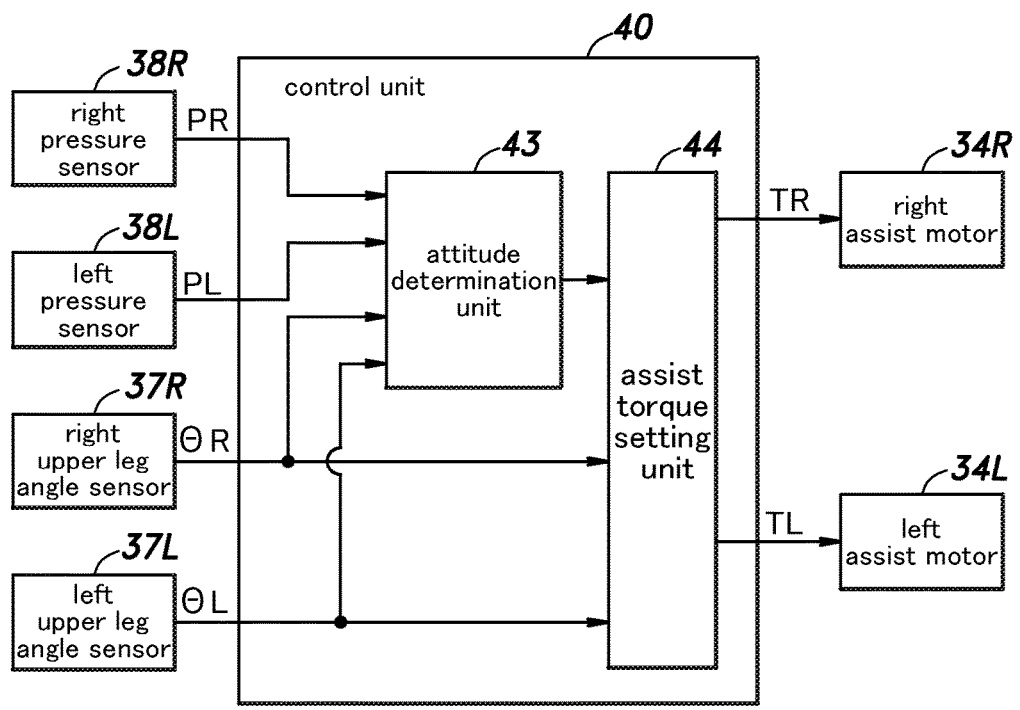
FIG. 10 is a functional block diagram a control unit of the hip joint motion assist device.

FIG. 10 is a functional block diagram of the control unit 40 shown in FIG. 9. As shown in FIG. 10, the control unit 40 includes an attitude determination unit 43 for determining the attitude of the user H from the pressure P acting on the upper surface of the upper leg part or the knee of the user.

The attitude determination unit 43 determines that the both of the elbows of the user H are placed on the respective knees or upper legs.

The determination result of the attitude determination unit 43 is used by an assist torque setting unit 44. The assist torque setting unit 44 determines the assist torques TR and TL of the assist motors 34 according to the bend angles ΘR and ΘL of the right and left upper legs detected by the respective angle sensors 37R and 37L. The computed assist torques TR and TL are converted into the corresponding values of electric current, and motor drivers supply the corresponding electric currents to the respective assist motors 34 from the battery 39 so that the required torques are produced from the assist motors 34. More specifically, when the upper leg angle sensors 38 have detected the upper legs of the user are upright, and the hip joints are bent (the torso is at angle relative to the upper legs), the assist torques are produced from the two assist motors 34. In other words, the control unit 40 starts an assisting operation for the motions of the two hip joints upon detecting that the upper legs of the user H are in the upright attitude and the hip joints are bent.

Figure 11A:
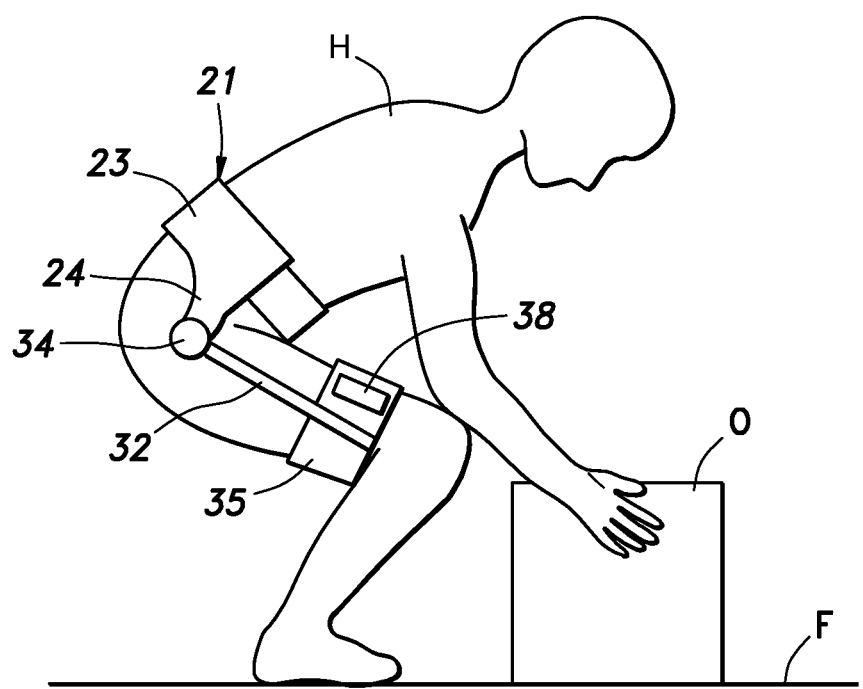
FIG. 11a is a simplified side view of the user wearing the hip joint motion assist device and is squatting ready to lift an object from a floor surface.

FIG. 11a is a simplified side view illustrating the attitude of the user H about to lift an object O with the knees bent and stooping over the object to the lifted. When the user attempts to lift the object O in this attitude, the knees are required to be extended at the same time as extending the hip joint. The motion of the hip joint is assisted by the assist motor 34, but the motion of the knee joint is not assisted. Therefore, a considerable load is applied to the user's knee.

Figure 11B:
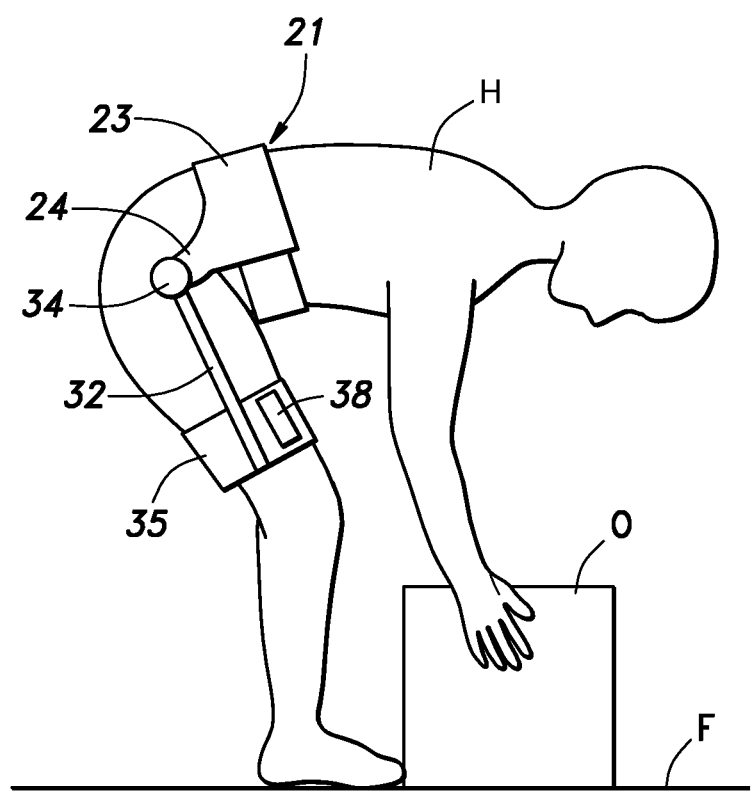
FIG. 11b is a view similar to FIG. 11a where the user is stooping over the object to be lifted.

FIG. 11b is a similar view when the knees are straightened. When the user lifts the object O from the floor surface F, as the knee joint is already extended, the knee joint experiences no substantially effort while the lifting motion is essentially entirely accomplished by the motion of the hip joint which is assisted by the assist motor. Therefore, the user is enabled to lift the object in a relatively effortless manner.

According to the illustrated embodiment, the assist torque setting unit 14 starts the assistance of the knee motions of the two knees upon detecting that the knee joints are extended and the hip joints are bent as this attitude is suited for supporting the load of the object O without causing any undue strain to the various parts of the body of the user.

Figure 12:
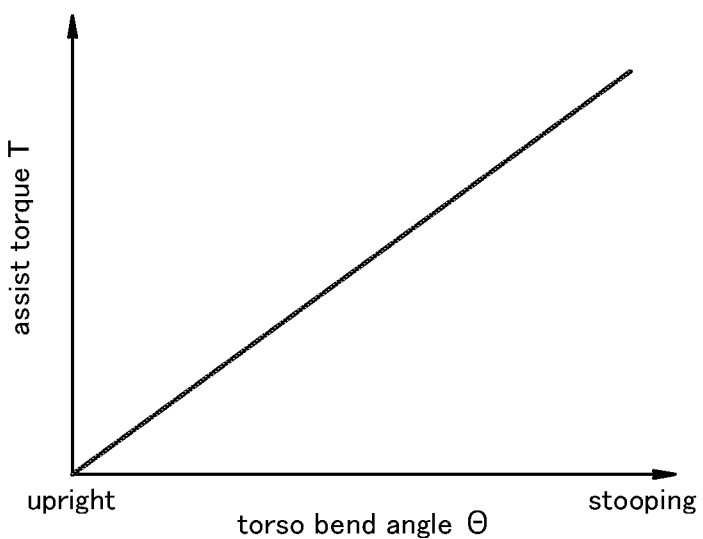
FIG. 12 is a graph showing the relationship between an assist torque and a bend angle of the hip joint.

FIG. 12 is a graph showing the relationship between the bend angle Θ of the hip joint and the assist torque T set by the assist torque setting unit 44. A small bend angle Θ of the hip joint means that the torso of the user H is straightened relative to the upper leg, and a large bend angle θ of the hip joint means that the user H is bending over the floor surface. The assist torque setting unit 44 sets the assist torque T to 0 when the bend angle Θ of the hip joint corresponds to the upright attitude of the user H, and increases the assist torque T in proportion to the increase in the bend angle Θ of the hip joint.

By configuring the assist torque setting unit 44 to provide an assist torque T in this manner, the hip joint motion assist device 21 provides a relatively large assist torque T to the user H in an initial stage of the lifting motion for the object O, and reduces the assist torque T as the lifting motion progresses. When the object O is fully lifted, and the bend angle Θ of the hip joint is substantially equal to zero, the assist torque T becomes equal to zero. Thereby, the hip joint motion assist device 21 can assist the user H to lift the object O in a comfortable and smooth manner.

Figure 13:
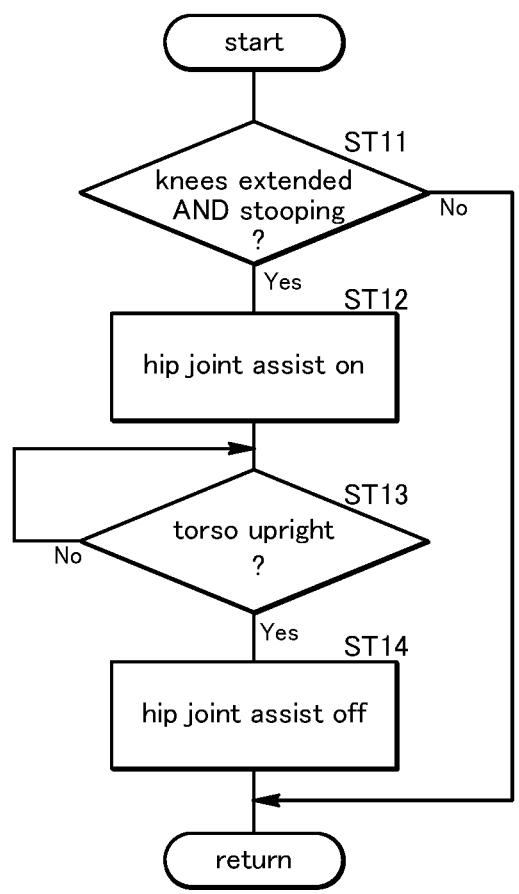
FIG. 13 is a flowchart showing the mode of operation of the control unit of the second embodiment.

FIG. 13 is a flowchart of the assist control performed by the control unit 40 shown in FIG. 10. When the power supply is turned on, the control unit 40 starts the assist control for generating the assist torque T in the left and right assist motors 4. During the execution of a main flow (not shown in the drawings), the control unit 40 periodically determines if the knees are extended and the torso is stooping over the floor surface or the object O according to the detection signals of the angle sensors 37 and 38 (step ST11). The determination result of step ST11 is Yes when the knees are extended and the torso is stooping over the floor surface or the object O. The determination result of step ST11 is No if the knees are bent or the torso is not stooping over the floor surface.

When the determination result of step ST11 is No, the program flow returns to the main flow. When the determination result of step ST11 is Yes, the control unit 40 starts a hip joint assist operation (step ST12) possibly with some time delay. In the hip joint assist operation, the control unit 40 sets the assist torque T to 0 when the hip joint bend angle Θ corresponds to the standing attitude of the user H, and set the assist torque T to a value proportional to the hip joint bend angle Θ via the left and right assist motors 34 as shown in FIG. 12. As a result, the user H is assisted by the hip joint motion assist device 21 in lifting the object O in a favorable manner.

Thereafter, the control unit 40 determines if the hip joints are both extended (step ST13). The determination result of step ST11 is Yes when the bend angles Θ of the left and right hip joints detected by the left and right angle sensors 37 are both equal to or less than a prescribed value (0 degrees, for example), and is otherwise No. When the determination result of step ST13 is Yes, the control unit 40 turns off the hip joint assist operation (step ST14), and returns to the main flow. When the determination result of step ST13 is No, the control unit 40 continues the hip joint assist operation of step ST13.

The motion assist device of the illustrated embodiment thus comprises, on each side of the user, a brace including the side frame member 24 secured to the pelvic part of the use U via the pelvic support member 22, the upper leg arm 32 having an upper end pivotally connected to a lower end of the side frame member 24, and secured to the corresponding lower leg of the user H via the band 35, a drive unit consisting of the assist motor 37 connected between the side frame member 24 and the upper leg arm 32 for effecting an angular motion between them, the angle sensor 38 affixed to a part of the upper leg such as the band 35 for detecting the attitude of the user H, and the control unit 40 for commanding the assist motor 37 to produce an assist torque when the angle sensor 37 has detected that the hip joint is bent and the angle sensor 38 has detected that upper leg of the user is at an angle (greater than a certain threshold value) relative to the plumb line. Thus, the hip joint motion assist device 21 of the illustrated embodiment does not activate the assist motor 37 when an undue strain would be placed on the knee joint of the user (such as when the user H is squatting prior to lifting the object). Therefore, the user H is prevented from lifting an object from the floor surface when the user's attitude is likely to cause strain on the knee joint of the user.

The attitude of the user that triggers the operation of the hip joint motion assist device 21 is determined as an attitude in which the user experiences relatively small strain on the knee joint of the user, and this attitude can be detected as an angle of the knee or the upper leg part of the user. Therefore, the user is taught in such a manner that a prescribed motion such as lifting an object from the floor surface is performed by assuming an appropriate attitude.

The side frame member 24 and the upper leg arm 32 transmit the assist torque T assisting the motion of the hip joint when the user H lifts the object O, and the angle sensor 38 detects the attitude in which the knee joint of the user H is bent. Therefore, when the user H initiates a motion to lift the object O, the assist torque T is transmitted to the upper leg when the attitude of the user is such that the strain on the knee joint is minimal.

The angle of the upper leg is measured by the angle sensor 38 as an angle relative to a plumb line in the illustrated embodiment, but may also be measured as a relative angle to the lower leg of the user. The angle sensor 38 may consist of a relatively inexpensive angle sensor, an electronic level sensor, a gyro sensor or the like. Therefore, it can be easily detected that the user H has taken an attitude in which the load on the knee joint is light.

The second modification may be modified from the foregoing embodiment in a substantially same manner as the first embodiment was modified as illustrated in FIG. 8.

Although the present invention has been described in terms of preferred embodiments thereof, it is obvious to a person skilled in the art that various alterations and modifications are possible without departing from the spirit of the present invention. For instance, the motion of the user that is to be assisted is not limited to those of the hip joint and the knee joint, but may also be other body parts of the user. The battery 9, 39 and the control unit 10, 40 may be supported by any parts of the user, instead of the belt or the pelvic part of the user. In addition, various elements shown in the above described embodiments are not entirely essential for the present invention, and can be appropriately omitted and substituted without departing from the spirit of the present invention.

The invention claimed is:

1. A motion assist device configured to assist an extending motion of a knee joint of a user when the user lifts an object, the motion assist device comprising:
   a brace configured to be worn by the user and including an upper member secured to a body part located above the knee joint and a lower member secured to a body part located below the knee joint;
   an assist motor provided in association with the brace and connected between the upper member and the lower member for effecting an assist torque to the upper member and the lower member to assist the extending motion of the knee joint;
   a control unit configured to control the assist torque of the assist motor; and
   an attitude detection sensor connected to the control unit for detecting a prescribed attitude of the user in which an elbow of the user has come into contact with an upper surface of a knee or upper leg part of the user;
   wherein the control unit is configured to activate the assist motor to assist the extending motion of the knee joint when the prescribed attitude of the user is detected by the attitude detection sensor.

2. The motion assist device according to claim 1, wherein the assist motor is configured to assist the extending motion of the knee joint when the attitude detection sensor has detected that the elbows of the user have both come into contact with the upper surfaces of the respective knees or upper leg parts of the user.

3. The motion assist device according to claim 1, wherein the attitude detection sensor is configured to detect a pressure or a force acting between the elbow and the upper surface of the knee or the upper leg part.

4. A motion assist device configured to assist an extending motion of a hip joint of a user when the user lifts an object, the motion assist device comprising:
   a brace configured to be worn by the user and including an upper member secured to a body part located above the hip joint and a lower member secured to a body part located below the hip joint;
   an assist motor provided in association with the brace and connected between the upper member and the lower member for effecting an assist torque to the upper member and the lower member to assist the extending motion of the hip joint;
   a control unit configured to control the assist torque of the assist motor; and
   an attitude detection sensor connected to the control unit for detecting a prescribed attitude of the user in which a bend angle of a knee joint of the user is smaller than a prescribed value, and a bend angle of the hip joint is greater than a prescribed angle,
   wherein the control unit is configured to activate the assist motor to assist the extending motion of the hip joint when the prescribed attitude of the user is detected by the attitude detection sensor.

5. The motion assist device according to claim 4, wherein the assist motor is configured to assist an extending motion of the hip joint when the attitude detection sensor has detected that the bend angles of the knee joints of the user are both smaller than a prescribed value, and the bend angles of the hip joints are both greater than a prescribed angle.

6. The motion assist device according to claim 5, wherein the attitude detection sensor is configured to detect an absolute angle of an upper leg.

7. The motion assist device according to claim 5, wherein the attitude detection sensor is configured to detect an angle of the upper leg relative to a lower leg.

* * * * *